June 20, 1939. G. W. HOPKINS 2,163,338
BUTTON-CUTTING MACHINE
Filed Sept. 25, 1936 7 Sheets-Sheet 1

Inventor
Glenn W. Hopkins
By Clarence A. O'Brien
Hyman Berman
Attorneys

June 20, 1939.                G. W. HOPKINS                 2,163,338
                           BUTTON-CUTTING MACHINE
                    Filed Sept. 25, 1936          7 Sheets-Sheet 2

Fig. 2.

Inventor
Glenn W. Hopkins
By Clarence A. O'Brien
   Hyman Berman
                    Attorneys June 20, 1939.  G. W. HOPKINS  2,163,338
BUTTON-CUTTING MACHINE
Filed Sept. 25, 1936  7 Sheets-Sheet 3

Inventor
Glenn W. Hopkins
By Clarence A. O'Brien
Hyman Berman
Attorneys

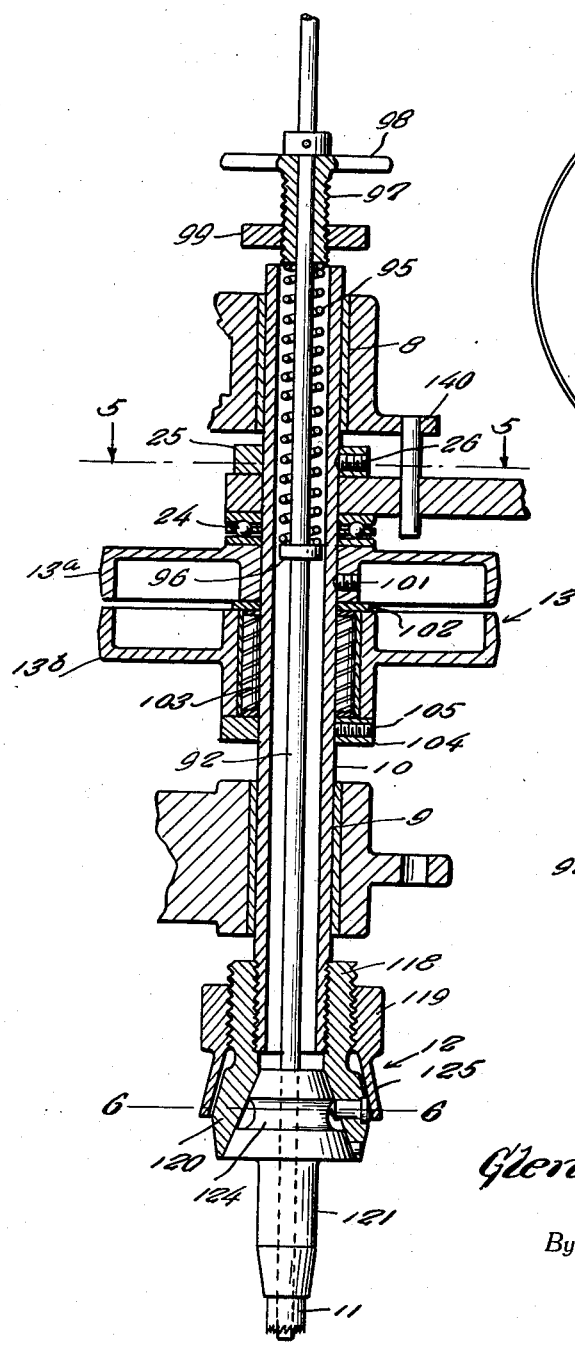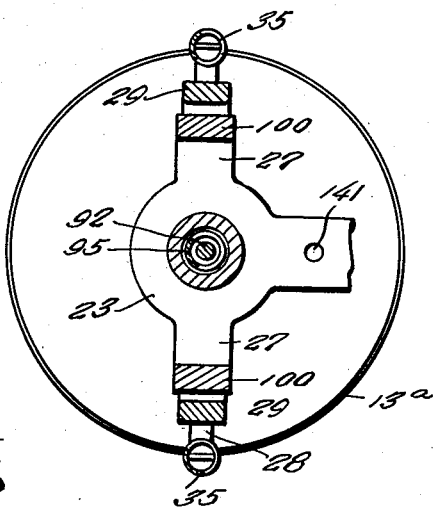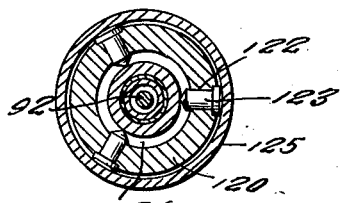

June 20, 1939.    G. W. HOPKINS    2,163,338
BUTTON-CUTTING MACHINE
Filed Sept. 25, 1936    7 Sheets-Sheet 5

Inventor
Glenn W. Hopkins
By Clarence A. O'Brien
Hyman Berman
Attorneys

Inventor
Glenn W. Hopkins
By Clarence A. O'Brien
Hyman Berman
Attorneys

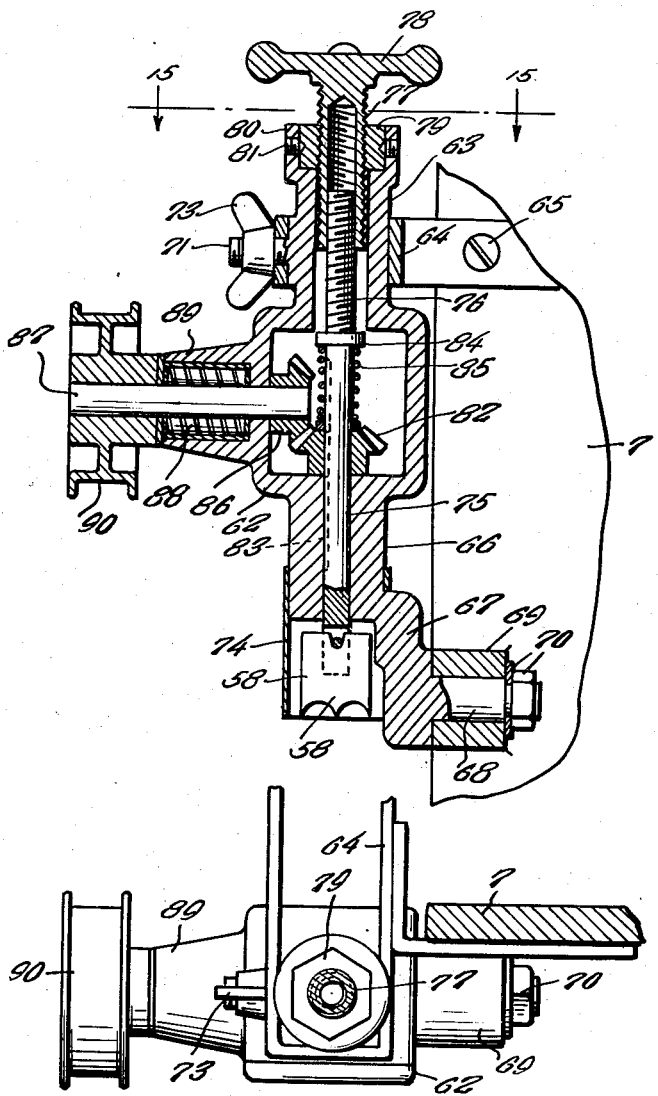

Patented June 20, 1939

2,163,338

UNITED STATES PATENT OFFICE 2,163,338

BUTTON-CUTTING MACHINE

Glenn W. Hopkins, Paducah, Ky., assignor to McKee Button Company, Muscatine, Iowa Application September 25, 1936, Serial No. 102,594

2 Claims. (Cl. 79—16)

This invention relates to button-cutting machines and consists of the novel construction, combination and arrangement of parts hereinafter described and subsequently claimed.

The invention together with its objects and advantages will be best understood from a study of the following description taken in connection with the accompanying drawings wherein:—

Figure 2 is a front elevational view of the machine.

Figure 3 is an enlarged detail view partly in section and partly in elevation and illustrating certain features hereinafter more fully referred to.

Figure 4 is a vertical sectional view also illustrating certain details hereinafter more fully referred to.

Figures 5 and 6 are horizontal sectional views taken substantially on the lines 5—5 and 6—6 respectively of Figure 4.

Figure 7:
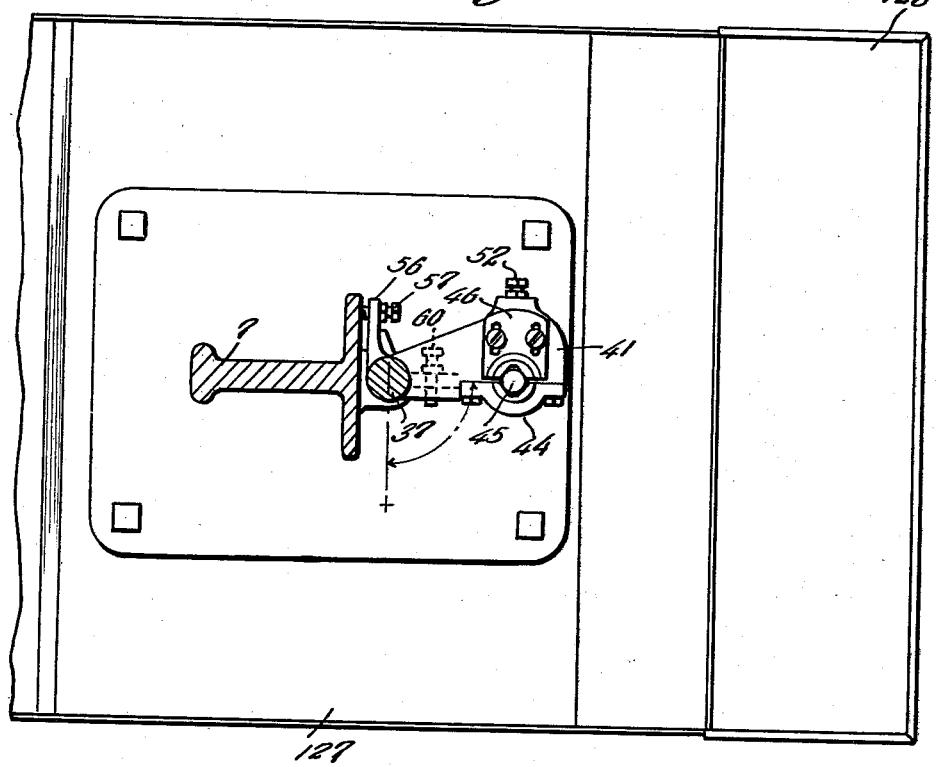

Figure 7 is a horizontal view showing in top plan the plug supporting bracket.

Figure 8:
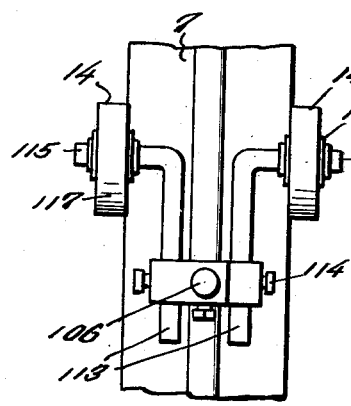

Figure 8 is a detail elevational view showing the mounting for the idler pulleys forming part of the belt and pulley driving equipment.

Figure 9:
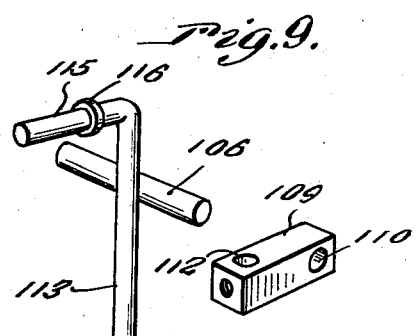

Figure 9 is an exploded view showing a pin, block, and pulley-supporting spindle, separated.

Figure 10:
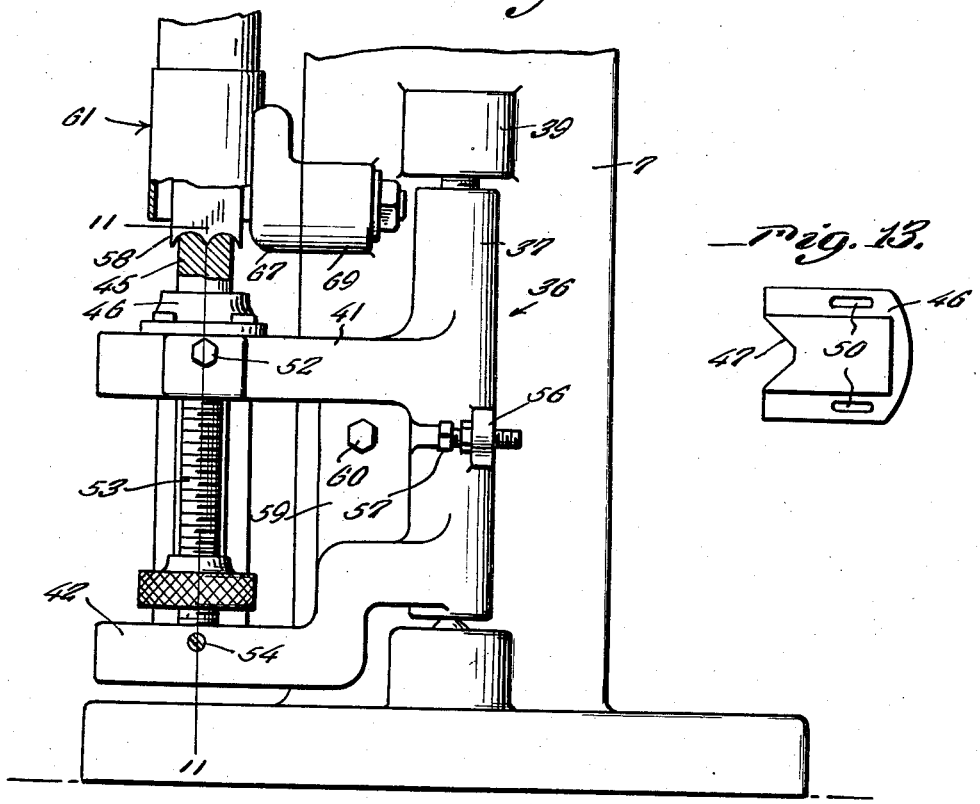

Figure 10 is an enlarged side elevational view showing in detail the plug dressing tool and supporting clamp for the plug.

Figure 11:
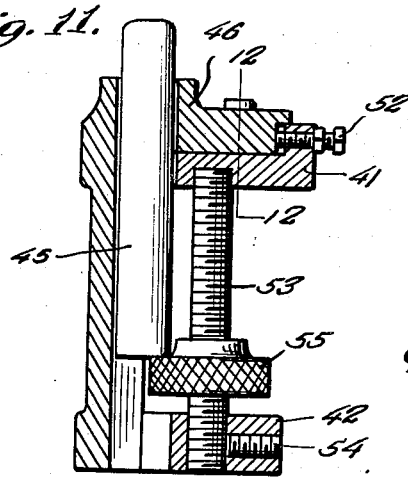

Figure 11 is a vertical sectional view taken substantially on the line 11—11 of Figure 10.

Figure 12:
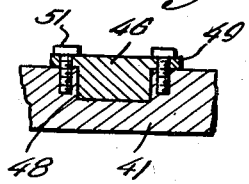

Figure 12 is a detail sectional view taken substantially on the line 12—12 of Figure 11.

Figure 13:
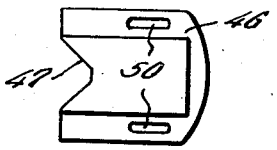

Figure 13 is a bottom plan view of a jaw member forming part of the plug-supporting clamp.

Figure 14 is a vertical sectional view through the plug-dressing tool.

Figure 15 is a horizontal sectional view taken substantially on the line 15—15 of Figure 14.

Figure 16 is a detail elevational view suggesting the manner of using the plug-dressing tool and Figure 17 is a fragmentary detail elevational view illustrating the operation of the machine on a blank of uneven contour.

Referring more specifically to the drawings the numeral 5 indicates generally the machine mounted upon the table or bench 6.

The frame 7 is provided with vertically alined bearings 8, 9 which accommodate, for vertical and rotative movement, a spindle 10.

The spindle 10 carries, at its lower end, a saw 11, and the chuck assembly for attaching the saw 11 to the lower end of the spindle 10 is indicated generally by the reference numeral 12 and will be hereinafter more fully described. The spindle 10 is driven by a belt 13 passing around a pulley assembly 13 mounted on the spindle 10 and pulleys 14 as shown. The pulley assembly 13 and the mounting for the pulleys 14 will be described hereinafter more fully in detail.

The frame 7 at its upper end and in substantial alinement with the bearings 8 and 9 is provided with a forked pair of arms 15 provided with studs 16 through the medium of which are pivoted to said arm links 17. Links 17 have right angularly disposed ends 18 to which are pivoted one end of longitudinally extensible rods 19, which in turn are pivoted to crank arms 20 provided on the respective opposite ends of a shaft 21.

Shaft 21 is journaled in a suitable bearing 22 provided therefor in the frame 7.

A collar 23 is confined on the spindle 10 between a bearing assembly 24 and a collar 25, the latter being secured to the shaft through the medium of a set screw 26. The collar 23 has projecting from diametrically opposite sides thereof arms 27 provided at their respective free ends with pins 28 through the medium of which are pivoted to the arms 27 of the collar links 29 which, in turn, are pivoted to the ends 18 of the links 17 as at 30. It will thus be seen that rocking movement of the shaft 21 will be transmitted through the rods 19, links 17, and links 29 to the spindle 10 for raising and lowering the latter.

For rocking the shaft 21 to raise and lower the spindle 10 there is detachably mounted on one end of the shaft 21 as at 31 a hub member 32. The hub member 32 has a transverse opening therethrough to accommodate a handle 33 which is secured at the desired adjustment relative to the hub 32 through the medium of a set screw 34. Thus it will be seen that the handle 33 may be adjusted as the "reach" of the operator may require.

For yieldably and normally urging the spindle 10 upwardly there are provided springs 35 which on one end are engaged with the pins 16 on the arms 15 and at their respective lower ends are engaged with the pins 28 on the collar arms 27.

At the base or lower end of the frame 7 there is swingably mounted for movement in a horizontal plane a plug holder or clamp indicated generally by the reference numeral 36.

Figure 3:
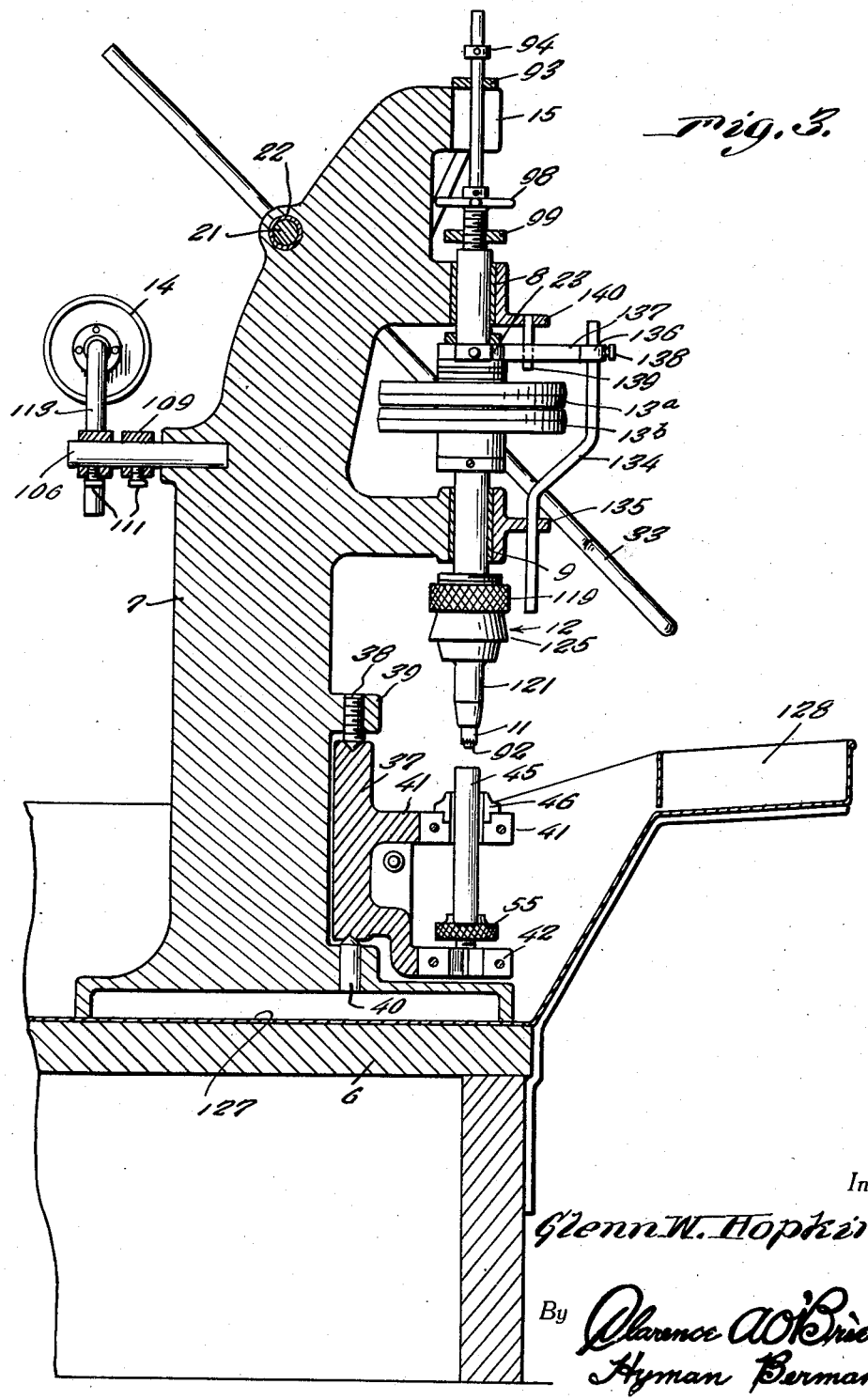

The plug holder or clamp 36 comprises a column or body member 37 the upper end of which is provided with a conical recess to accommodate the conical end of a bearing screw 38 threaded through a lug 39 provided on the frame 7 as shown in Figure 3. On its lower end the column or body 37 is also provided with a conical recess to accommodate the conical end of a bearing pin 40 suitably fitted within a bore provided therefor in the base of the frame 7 as is also clearly shown in Figure 3.

The column or body member 37 has upper and lower arms 41, 42 projecting therefrom, and at their respective free ends the arms 41, 42 are provided to form semi-circular clamps to which are secured as at 43 lateral lugs provided at the upper and lower ends of a semi-cylindrical guide member 44.

The guide member 44 accommodates in the groove thereof a plug 45. The plug 45, as is well-known in the art, is provided for the supporting thereon, in operative position to the saw 11 the shells from which the button blanks are cut. Plug 45 is usually of wood but may be made of rubber, fibre, or any other suitable material.

To secure the plug 45 clamped at the desired adjustment there is slidably mounted on the upper arm 41 a jaw 46 the head of which is grooved as at 47 complemental to the groove of the member 44. In this connection it will be understood that the groove of the member 44 and the groove 47 of the head 46 are substantially V-shaped to provide a non-circular opening the walls of which will so frictionally grip the plug 45 as to secure the same against accidental turning movement within the bracket or fixture 36.

The body of the shiftable and adjustable jaw 46 works in a groove 48 provided therefor in the arm 41 and is provided with lateral flanges 49 equipped with slots 50 through the medium of which and screw 51 the jaw 46 is secured at the desired adjustment. For adjusting the jaw 46 there is provided a suitable adjusting screw 52 threadedly engaged on the arm 41 as illustrated. (See Figures 11 and 12.)

For shifting the plug 45 to the desired raised or lowered position, there is provided a threaded shank 53 the upper end of which is threaded to the arm 41 and the lower end of which is threaded into the arm 42 of the fixture or clamp 36. The shank 53 is secured against turning movement through the medium of a set screw 54 threaded into the arm 42 to bear against the lower end of the member 53. On the member 53 is a nut or follower 55 on which rests the lower end of the plug 45 as shown in Figure 11. Thus it will be seen that by threading the nut or follower 55 axially of the threaded member 53, and in the proper direction the plug 45 is moved to the desired position of adjustment.

For limiting rotative movement of the fixture or clamp 36 in one direction and insure a proper alinement of the plug 45 with the saw 11 there is provided on the column 37 a laterally extending lug 56 with which is threadedly engaged an adjusting screw 57 positioned to engage the frame 7 when the fixture 36 is swung to a position for alining the plug 45 with the saw 11.

For limiting swinging movement of the fixture 36 in a reverse direction and to insure an alining of the plug 45 with the dressing tool 58 hereinafter more fully referred to, there is threadedly engaged with an integral web 59 of the fixture 36 a stop screw 60.

There is also provided a dressing tool assembly indicated generally by the reference numeral 61.

The assembly 61 in addition to the dressing tool 58 includes a gear box 62 provided at its upper end with integral tubular extension 63 which works in an arcuate frame-like guide 64 mounted on the frame 7, being secured to the frame 7 at one end as at 65.

Integral with the lower end of the gear box 62 is a cylindrical extension 66 that has integral therewith an arm 67 provided with a pivot spindle 68 journaled in a bearing 69 provided therefor on the frame 7. A suitable nut and washer assembly 70 is provided on one end of the pivot spindle 68 to retain the same engaged with the bearing 69 as shown in Figure 14.

For securing the gear box 62 and associated parts in a vertical position or at a desired angle to the perpendicular the tubular extension 64 is provided with a threaded pin 71 that operates through a slot 72 provided in the guide 64, and threadedly engaged with the pin 71 is a thumb nut 73. (See Figures 1 and 14.)

The dressing tool 58, preferably protected by a suitably mounted and arranged shield 74 is suitably carried on one end of a shaft 75 that works through a bore in the extension 66 of gear box 62.

On its upper end the shaft 75 is provided with a threaded section that is threadedly accommodated within the threaded socket of a shank 77.

Shank 77 is provided on its upper end with a hand wheel 78, and said shank is also externally threaded and is threadedly engaged with a nut 79 removably secured within a socket 80 provided at the upper end of the extension 63, set screws 81 being provided for securing the nut 79 within the socket 80.

Within the gear case 62 is a bevel gear 82 the hub of which is provided with a key that works in an elongated way 83 provided in the shaft 75. Interposed between the gear 82 and a fixed collar 84 on the shaft 75 is a spring 85. Thus it will be seen that by turning the hand wheel 78 shaft 75 may be projected or retracted to properly adjust the dressing tool 58 relative to the plug 45 to be dressed.

Meshing with the gear 82 is a gear 86 provided on the inner end of a shaft 87 journaled in a bearing structure 88 provided therefor within a boss 89 projecting from one side of the gear case 62. On the outer end of the shaft 87 is a pulley 90 over which a belt or the like is trained for transmitting drive to the shaft 87 from a suitable source of power. Obviously drive from the shaft 87 will be transmitted through the gearing 86, 82 to the shaft 75 for rotating the same, and the dressing tool 58 at the lower end of the shaft rotates with the shaft, as is apparent.

In Figure 16 is illustrated the angular position of the axis of the dressing tool 58 with respect to the axis of the plug 45 for dressing the upper end of the plug so that, as shown in Figure 17, the dressed plug will accommodate the shell or blank 91, when the latter is of uneven contour. In this connection it will be understood, and as well-known in the art that shells are of such contour as precludes button-blanks being cut from certain portions thereof where the upper end of the support-plug, such as for example the plug 45, is dressed down flat and smooth. Because of their peculiar contours such sections of the shells can be utilized only when the upper end of the supporting plug is dressed to accommodate these peculiar contours. Hence, through the medium of my dressing assembly the upper end of the plug 45 may be so dressed as to accommodate the contour of any selected section or part of a shell to the end that such sections may be used for the purpose of cutting a button blank or blanks therefrom insuring at the same time the cutting of the blanks that will permit the use of the same in the making of a button of the desired quality and perfection.

For engaging and forcing from the saw 11 the cut disk of shell there is provided an ejector rod 92 (Figure 4) that extends through the spindle 10, and has its upper end working through an aperture in a plate 93 bridging the forked arms 15, aforementioned, and mounted on the upper end of the frame 7. Also on the upper end of the ejector rod 92 and secured thereto at the desired adjustment through the medium of a set screw, or as otherwise found desirable, is a stop collar 94.

Associated with the rod 92 is a spring tension device which includes a spring 95 one end of which seats against a collar 96 provided on an intermediate portion of rod 92, and the upper end of which seats against a short tubular member 97 sleeved on the rod 92 and equipped at its upper end with handle means 98. The adjusting tube 97 threads through a fixed plate 99 supported above the bearing 8 through the medium of a pair of oppositely disposed integral arms 100 that extend downwardly from the plate 99 and at their lower ends are provided with openings to receive the pins 28 projecting from the arms 27 of the aforementioned collar 23. Thus it will be seen that by threading the tube 97 in the proper direction through the plate 99 spring 95 will coact with the tube 97 and the collar 96 for axially adjusting the rod 92 to vary the ejecting stroke of the ejector rod 92 without varying the tension on the spring 95. This is desirable for the reason that if the tension on spring 95 is being constantly varied, especially by attendants not thoroughly skilled, the ejecting force of the rod 92 is oftentimes materially reduced so that the rod does not function in a completely satisfactory manner. Thus, in accordance with the present invention, provision is made for adjusting the working stroke of the ejector rod 92 through the instrumentality of means which render the adjustment practically fool-proof.

Referring to the aforementioned pulley assembly 13 it will be seen that the same comprises an upper pulley 13a which is fixed to the spindle 10 as at 101 and a lower pulley 13b the hub of which is spaced from the hub of the pulley 13a through the medium of a spacer disk 102, and in which hub is confined a suitable bearing assembly 103. The hub of the pulley 13b also rests on a collar 104 fixedly secured on the spindle 10 through the medium of a set screw 105. Thus it will be seen that when the spindle 10 is in a raised position the belt 13 is trained about the pulley 13b which latter will merely idle about the spindle 10 as an axis so that no drive will be transmitted from the source of power to the spindle 10. On the other hand when the spindle 10 is in the lowered position the belt will shift from the pulley 13b to the pulley 13a which is fixed to the spindle 10 and consequently drive will be transmitted to the spindle 10 for rotating the latter and the saw 11 at the lower end of the spindle 10.

Reference is also now had to the mounting of the pulleys 14. Such mounting in the present instance comprises a supporting rod 106 having an end secured through the medium of a set screw 107 in the socket of a boss 108 suitably provided on the frame 7.

For each of the pulleys 14 there is provided a block 109 (Figure 9) having an opening 110 through one end thereof to receive a free end portion of the rod 106. A set screw 111 serves to secure the block at the desired adjustment on the rod 106.

The block 109 has a vertical opening 112 therethrough which receives the shank 113. Shank 113 is secured at the desired adjustment through the medium of a set screw 114.

At its upper end the shank 113 is bent laterally to provide a spindle or stub shaft 115 on which is journaled a pulley 14, the pulley being retained on the spindle 115 through the medium of a fixed collar 116 and a nut and washer assembly 117. (See Figure 8.)

Thus it will be seen that a mounting, somewhat universal in effect, is provided for the pulleys 14 permitting a wide range of adjustment of the position of the pulleys 14 and as may be required to increase or take up slack in the belt 13.

Referring now to the chuck 12 (Figures 4 and 6) it will be seen that the same comprises a sleeve 118 internally threaded to be screwed onto the threaded lower end of the spindle 10 and externally threaded to have screwed thereon a nut member 119.

The sleeve 18 has a substantially double-cone end 120 provided with a conical bore to receive the conical head of the saw carrying spun 121. At intervals the end 120 of the chuck sleeve 118 is provided with radial openings 122 in which work headed studs or retaining pins 123. The inner ends of the pins 123 engage in a groove 124 provided in the head of the spun 121 and the head-equipped ends of the pins 123 are engaged by a frustro-conical skirt 125 formed integral with one end of the nut 119, when the nut 119 is threaded downwardly on the sleeve 118. Thus the pins 123 are forced inwardly to engage the groove 124 for securing the saw spun 121 engaged with the chuck assembly 12.

Figure 1:
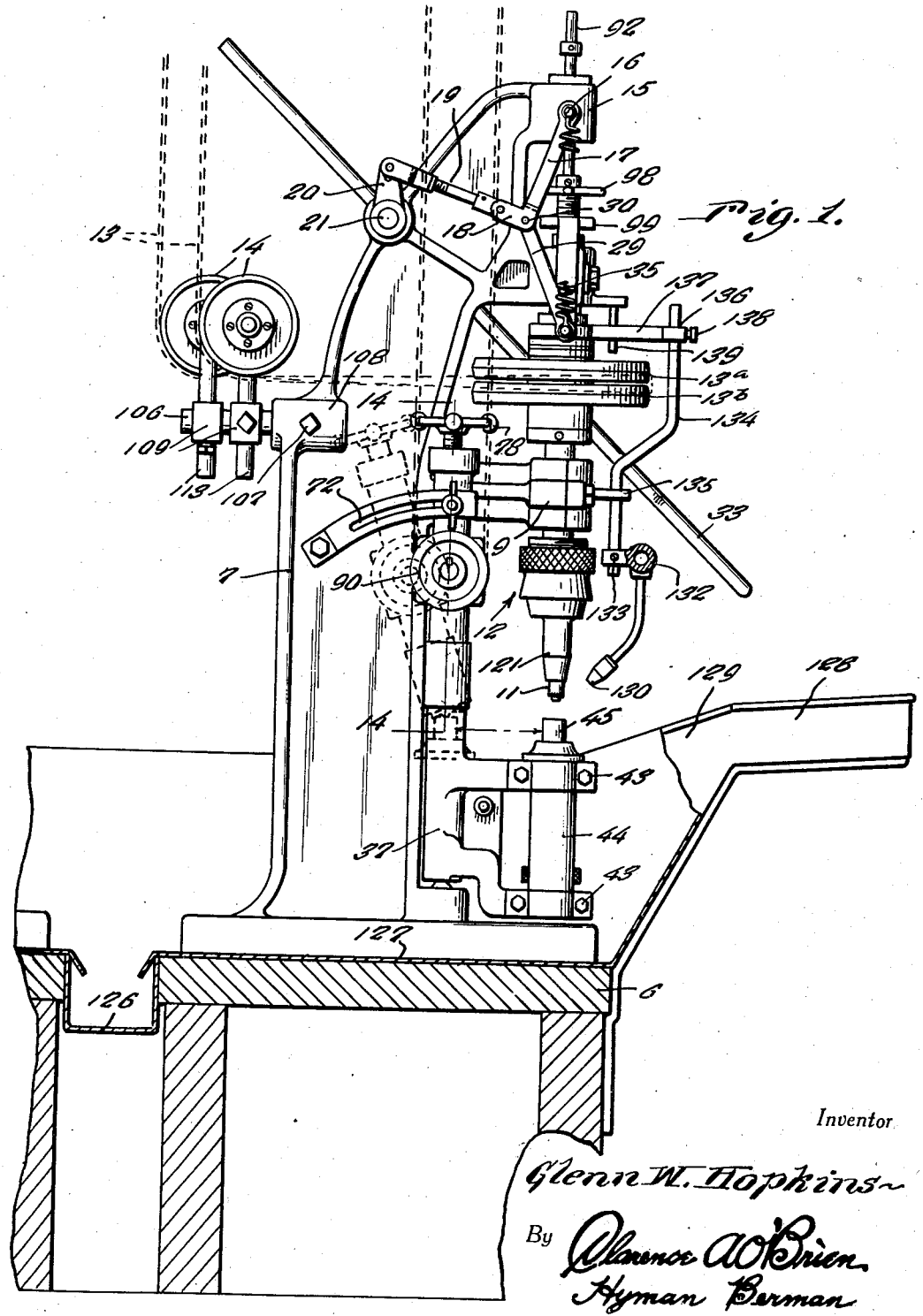
Figure 1 is a side elevational view of the button-cutting machine embodying the features of the present invention.

In Figure 1 is suggested the idea of mounting the frames 7 of the button-cutting machines at intervals on elongated tables 6 the tables arranged in pairs and in slightly spaced relation to accommodate between their adjacent longitudinal edges a trough 126 common to pans 127, there being one pan 127 for each button-making machine and each pan having extending from the front side thereof a tray 128 connected with its pan 127 through the medium of a downwardly and rearwardly directed chute 129. The tray 128 is adapted to hold shells or other material to be operated upon, in ready use of the operator, the tray being about waist high to the operator to extend over the lap of the operator sitting at the table 6.

The pan 127 is for the purpose of catching the waste shell scrap and to prevent water flowing from nozzles 130 from unduly splashing the operator.

The nozzles 130 are provided for directing a constant stream of water on the shell and work during the button-sawing operation. The water may be supplied from any suitable source and through a pipe 131 and a distributor head 132 to which the pipe 131 and the nozzles 130 are connected. Head 132 is suitably secured as at 113 on the lower end of an angular rod 134.

Rod 134 has a lower end portion extending through an opening provided in a lug 135 projecting from the bearing 9 and an upper end extending through an eye 136 provided on the free end of an arm 137 extending from the aforementioned collar 23. The rod 134, and consequently the nozzles 130, are secured at the desired adjustment through the medium of a set screw 138.

The aforementioned collar 123 is also held against rotative movement relative to the spindle through the medium of a pin 139 that extends downwardly from a lug 140 on bearing 8 and through an opening 141 provided therefor in the arm 137.

While the frame 7 may be made of cast iron, it is desirable that the spindle 10, the parts of the chuck 12, and other such parts as may be wetted or become damp and likely to rust and stick, detracting from the desired smooth operation of the machine, be made of aluminum or other non-rusting metal.

The operation of the machine may be briefly described as follows:

Upon manipulation of the handle 33, rocking the shaft 21 in a clockwise direction, motion is transmitted from the shaft 21 through the rods 19 and links 17 and 29 to the spindle to depress the rotating spindle against the action of springs 35. Continued downward movement of the rotating spindle 10 brings the serrated edge of the saw 11 into cutting engagement with the shell 91 to be cut. Thus a blank is cut from the shell as the saw travels on downwardly and through the shell.

When the blank is being cut in this manner the operator thereupon releases the handle 33, or swings it upwardly, assisted by the springs 35, and the shell 91 is re-positioned for cutting another blank.

This operation is continued until it is desired to re-face or dress the shell-supporting plug 45.

To re-face or re-dress the upper end of the plug 45 the bracket or fixture 36 is swung from the position shown in Figure 1 to the position shown in Figure 10. By loosening the nut 73 the dressing tool assembly may be swung in a path defined by the bracket 64 to the desired position of adjustment relative to the perpendicular, as for example to the position suggested in Figure 10. When the desired adjustment has been made the operator then turns the wheel 78 for feeding the shaft 75 downwardly to engage the dressing tool 58 with the plug 45. Drive from the source of power is transmitted to shaft 75 through the pulley 99 and the gearing 86, 82 for rotating the shaft and the dressing tool 58. Thus in this manner the plug 45 is conveniently dressed for the purpose of accommodating the irregular contoured section or part of the shell from which a button blank is to be cut.

After the dressing operation has been completed the handle 78 is rotated in a reverse direction for moving the tool 58 out of engagement with the plug 45 and the bracket or fixture 36 is then swung back into position alining with the spindle 10 for use in conjunction therewith for cutting the blanks from the shells.

It is thought that a clear understanding of the construction, utility and advantages of a button-cutting machine having the features of the present invention as herein illustrated and described, will be had without a more detailed description.

It is also to be understood that while I have herein illustrated and described a preferred embodiment of the invention, that various changes in details and construction may be resorted to without departing from the invention as defined in the appended claims, and accordingly, my invention is to be considered comprehensive of all forms of structure coming within the scope of said claims.

Having thus described the invention what is claimed as new is:

1. In a machine of the class described, a vertical support, button-blank cutting mechanism located vertically in front of the support, means for mounting said mechanism for up and down movement, said mechanism including a spindle having a blank cutting saw at its lower end, and means for rotating the spindle including a pulley fixed on the spindle, a second pulley loosely mounted on the spindle below the first pulley and rotatable relative to the spindle as an axis, a driving belt having a portion trained relative to the pulleys to engage the lower pulley when the blank-cutting mechanism is in an upward position and to engage the upper pulley when the blank mechanism is in a lower position for rotating the spindle in said lowered position, a supporting pin mounted on said support, oppositely extending blocks adjustably mounted on the supporting pin, shank members connected with the blocks for vertical adjustment and provided at their upper ends with spindles and idler pulleys for the belt journaled on said spindle.

2. A button cutting machine comprising a vertical support, bearings carried by said support and arranged in vertical alignment with each other, a spindle mounted in said bearings for rotation and vertical sliding movement and having a cutter connected to the lower end thereof, a yoke rotatably mounted on the spindle, pivotally connected links pivoted on the yoke and on the support and including angularly disposed extensions, contractible springs connected to the yoke and to the support and acting to urge the spindle to slide upwardly, superimposed pulleys on said spindle and one of said pulleys secured on the spindle and the other pulley free to rotate relative to the spindle, means for supporting a power belt to engage either of the pulleys in accordance with the upward and downward positions of the spindle and carried by the support, and a manually actuated control means mounted on the support for imparting vertical movement to the spindle in opposite directions and including a shaft mounted on the support for rotation in either direction, and means connecting said shaft to the angularly disposed extensions of the links for moving the spindle upwardly by positioning of the links angularly to each other and for moving the spindle downwardly by positioning of the links in vertical alignment with each other.

GLENN W. HOPKINS.